United States Patent Office 3,142,171
Patented July 28, 1964

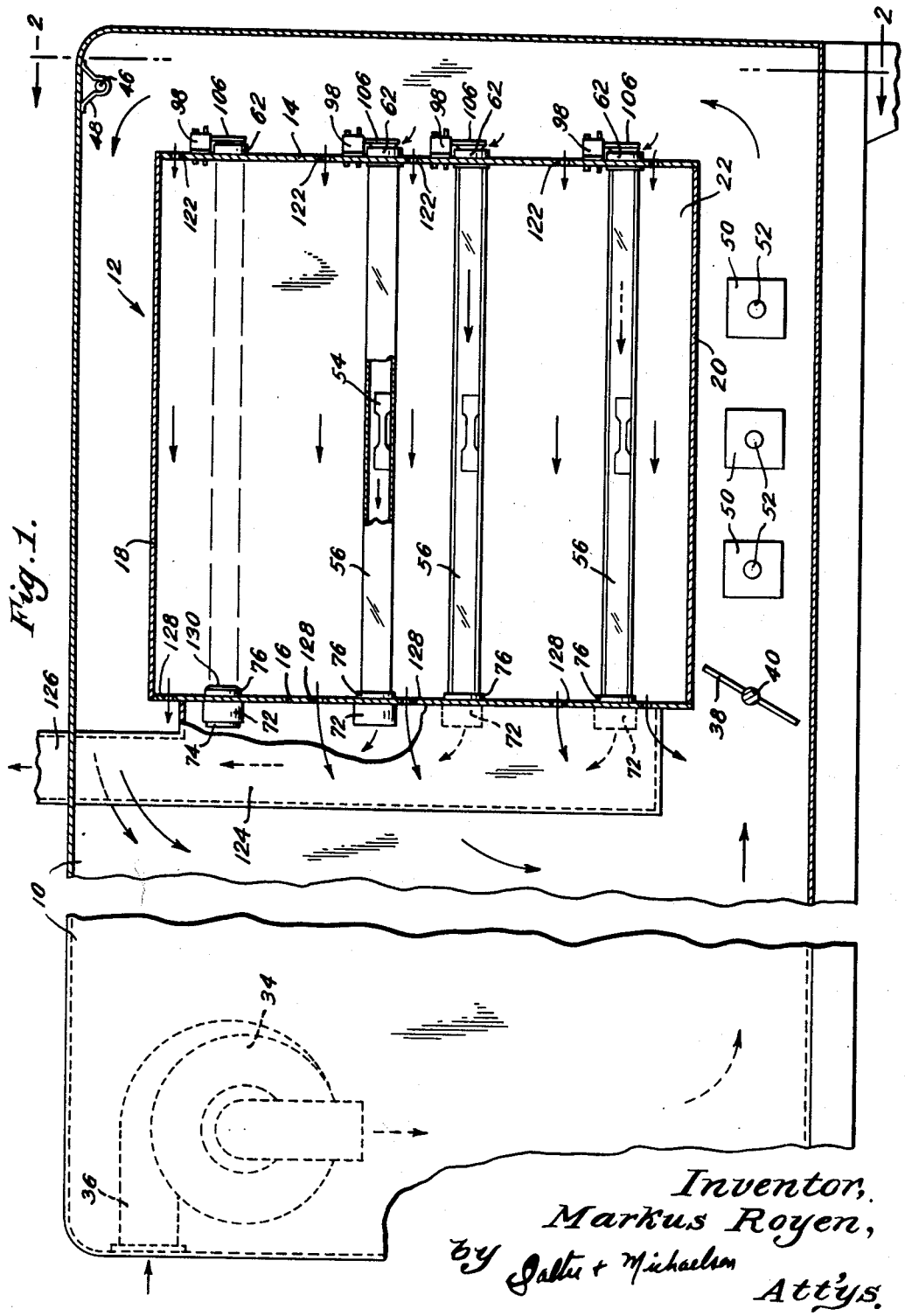

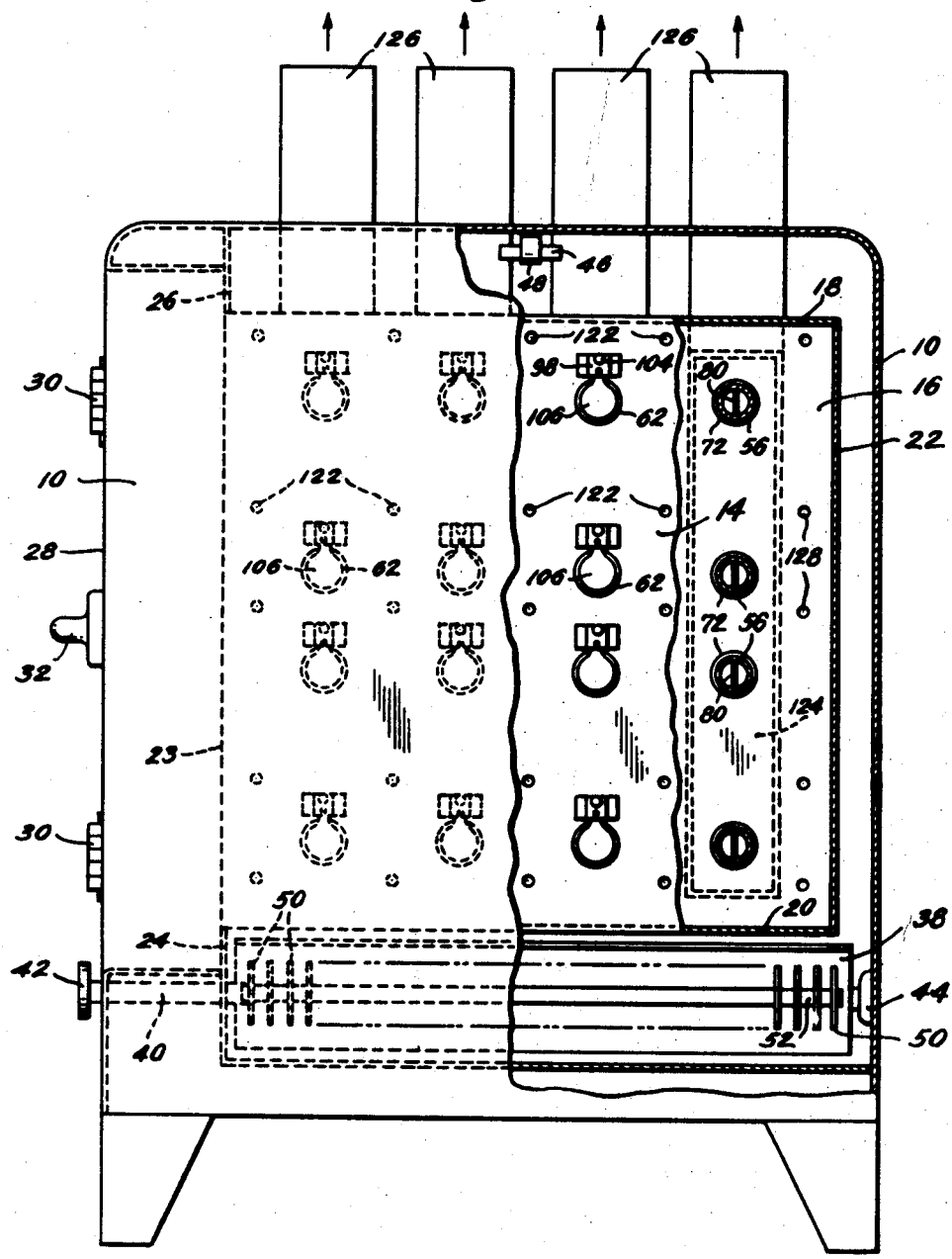

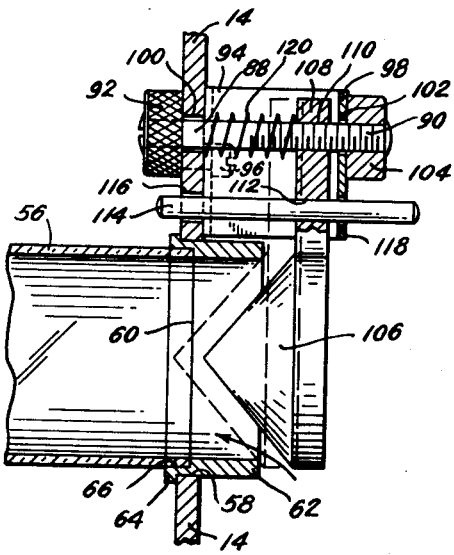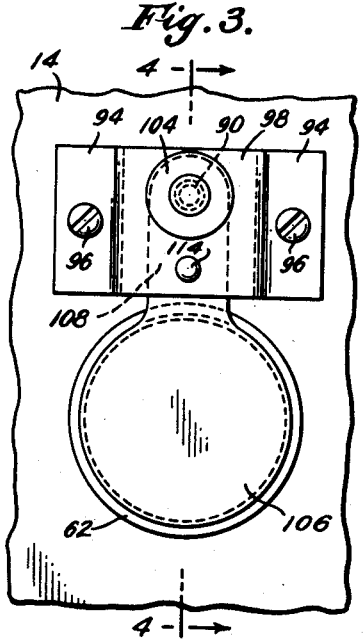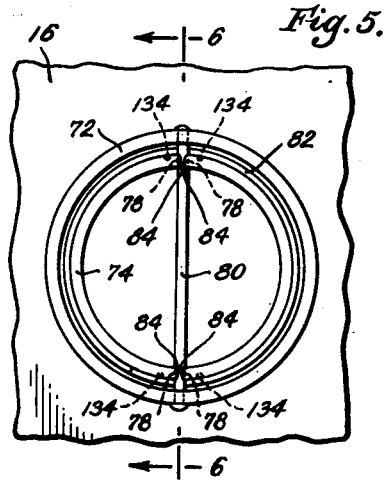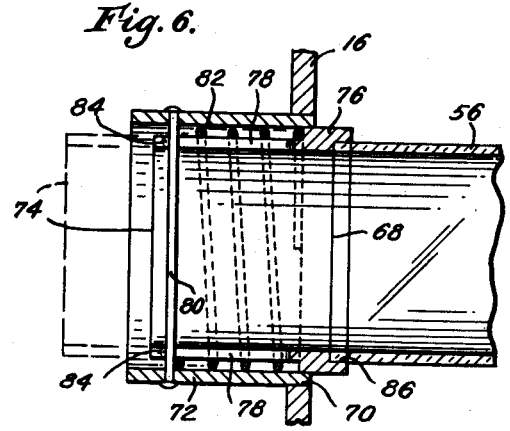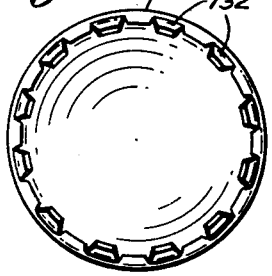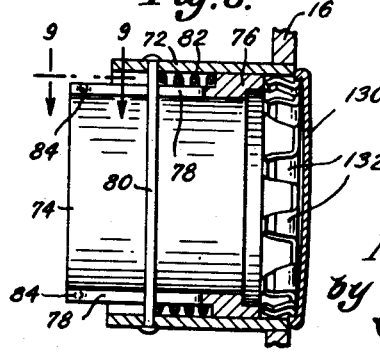

3,142,171
APPARATUS FOR PERFORMING ACCELERATED AGING TESTS ON ELASTOMERS
Markus Royen, Pawtucket, R.I., assignor to Apex Tire & Rubber Company, Providence, R.I., a corporation of Rhode Island
Filed Mar. 13, 1961, Ser. No. 95,345
7 Claims. (Cl. 73—15)

The present invention relates generally to testing techniques and equipment and is more particularly concerned with a novel apparatus for performing accelerated aging tests on elastomers.

The aging properties of elastomers, such as polyvinyl chloride, for example, are largely dependent on the type and proportion of plasticizers which they contain. Aging is a complex process involving, among other things, an accelerated migration of plasticizers to the surface of the material and subsequent evaporation. Even though the polymer itself remains basically unchanged, this loss of plasticizers causes a distinct change in the properties of the material. Therefore, aging tests are commonly a part of specifications for elastomer compounds, such as polyvinyl chloride.

The basic technique which has heretofore been used in performing accelerated aging tests on elastomers has been to cause a flow of warm air to pass through the testing cavity of an oven in which the test samples or specimens are freely hung. More specifically, "forced air mechanical convection ovens" have been used for this purpose. The shortcomings of this technique are that the air flow cannot be accurately calibrated, and further that the rate of air flow varies throughout the oven cavity. In addition, the samples, not being separated from each other, are in no way protected from the effects of cross contamination. By using this technique, it has been possible to precisely specify only temperature and time. but not rate of air flow over the specimens, which has resulted in non-reproducibility and non-uniformity in the test results. This lack of uniformity in this type of test is commonly known and has long been a problem in industry.

In an effort to overcome these shortcomings, there has been developed what is known as a tubular system. In this system, the specimens are placed in tubes which extend across the oven cavity. Hence the specimens can be separated one from the other, and at the same time, the rate of flow in each tube can be calibrated and predetermined. This results in great improvements in reliability and reproducibility of the test results.

The instant invention relates to improvement in this tubular technique. First of all, since the air in the oven is constantly being recirculated through the tubes and over the test samples, it is impossible to determine to what degree the air has been contaminated. Expressed differently, it will be understood that the air passing over the test sample is impregnated with a certain indeterminable amount of plasticizer as the latter emanates and migrates from the surface of the test sample. Thus, when the air is recirculated into contact with the test sample once again, it is no longer fresh air, but rather the air is now contaminated to a certain indeterminable degree. This has a very definite effect on the material being tested and on the test results, but it is difficult to calibrate just what this effect is, and hence this factor affects the test results. This is particularly so where different elastomeric materials are being tested in one oven, since the plasticizers in one material may be picked up by the air and actually imparted to another material.

Another factor in the existing tubular apparatus which has caused some concern is the amount of turbulence present in the air entering each of the testing tubes. More specifically, since it is essentially that the air-flow over the test samples be smooth and uniform, it is necessary that the samples be placed in the tube a sufficient distance from the entrance end thereof so that the turbulence will have diminished by the time the air contacts the samples. This obviously reduces the space in each tube that can accurately be used for testing purposes. Thus, by reducing this turbulence, the testing capacity of each tube is increased.

It is therefore a primary object of the instant invention to provide an improved apparatus for performing accelerated aging tests on elastomers wherein the results of said tests will be reproducible to a higher degree than the previous tubular system, particularly when specimens representing different basic chemical compositions are tested simultaneously.

Another object of the present invention is the provision of an apparatus of the character above described wherein the test samples are never contacted by contaminated air.

Another object of my invention is the provision of a novel apparatus of the character above described wherein there is a minimum of turbulence of the entering air in the tubes.

A further object of my invention is the provision of novel and improved apparatus for performing accelerated aging tests on elastomers, which improved apparatus may be installed in existing equipment.

Other objects, features and advantages of the invention will become apparent as the description thereof proceeds when considered in connection with the accompanying drawings.

In the drawings which illustrate the best mode presently contemplated by me for carrying out my invention:

FIG. 1 is a front elevational view of an oven embodying the present invention, with parts broken away for purposes of illustration;

FIG. 2 is a side elevational view of the oven shown in FIG. 1 with a part thereof in section on line 2—2 of FIG. 1 and with other portions broken away for purposes of illustration;

FIG. 3 is a fragmentary elevational view, on an enlarged scale, illustrating the air flow regulating means;

FIG. 4 is a section taken on line 4—4 of FIG. 3;

FIG. 5 is an elevational view, on an enlarged scale, partly in section, showing the means for receiving the discharge ends of the tubes which form a part of the instant apparatus;

FIG. 6 is a section taken on line 6—6 of FIG. 5;

FIG. 7 is an elevational view, on an enlarged scale, of a cover element which forms a part of my invention;

FIG. 8 is a fragmentary elevational view, on an enlarged scale, and in section, illustrating the cover member of FIG. 7 in assembled position; and FIG. 9 is a fragmentary sectional view, on an enlarged scale, taken on line 9—9 of FIG. 8.

Referring now to the drawings and more particularly to FIGS. 1 and 2 thereof, there is shown an oven 10 having therein a housing 12 comprising a front wall 14, a rear wall 16, a top wall 18, a bottom wall 20, and a single side wall 22, the other side 23 of the housing 12 being open so that the interior of the housing is accessible when the door 28 of oven 10 is opened. It will be noted that door 28 is hingedly mounted as at 30 and is provided with a handle 32 for facilitating swinging movement of the door to open and closed position.

As will be seen most clearly in FIG. 1, the oven 10 is provided with a centrifugal blower 34 for circulating the air in the oven 10 in the direction of the arrows shown. An intake duct 36 is provided for venting fresh air into the furnace to replace air which is exhausted from the furnace, as will be hereinafter described in more detail. The air within housing 10 is circulated by blower 34 past a damper 38 which extends transversely across the oven beneath the housing 12 adjacent rear wall 16 of the housing. Damper 38 is pivotally mounted on a transversely extending pin 40 which extends to the outside of the oven beneath door 28 and terminates in a control handle 42. The opposite end of pin 40 is journalled in a suitable bearing 44. Since damper 38 is fixed to pin 40, it will be seen that handle 42 can be manipulated to regulate the flow of air which passes beneath housing 12.

It will be understood that the interior of oven 10 may be heated by any suitable and conventional means, and suitable controls (not shown) are provided on the exterior of the oven for enabling the oven to be set to any desired temperature. A thermocouple 46 or any other suitable temperature indicating device is mounted on the inside of the oven, such as by bracket 48, in order that the temperature within the oven may be periodically checked. In the illustrated embodiment, the oven 10 is shown as being heated by means of radiation fins 50 mounted on spaced transversely extending heating tubes 52 located beneath bottom wall 20 of housing 12. Thus, air which passes by damper 38 automatically passes through the fins 50 before coming into contact with the specimens to be tested.

The specimens to be tested 54 are placed in elongated tubes 56, preferably constructed of glass, which tubes extend across housing 12 from the front wall 14 to the rear wall 16 thereof. As will be seen most clearly in FIG. 4, front wall 14 is provided with a plurality of openings 58 each of which is in alignment with the input or entrance end 60 of tubes 56. Specifically, it will be seen that a circular collar 62 is pressed into opening 58, said collar having a peripheral flange 64 which abuts against the inside surface of wall 14. Collar 62 is further provided with an annular recess 66 which slidably receives the end 60 of tube 56. Referring now to FIG. 6, it will be seen that the opposite end 68 of tube 56, which is the discharge or exit end, is in alignment with an exit opening 70 provided in rear wall 16. A cylindrical bushing 72 is pressed into opening 70 and extends outwardly from the rear surface of wall 16. A collar 74 is slidably mounted within bushing 72, said collar having an enlarged annular flange portion 76 at its inner extremity, the outer surface of said flange portion having a diameter that is just slightly less than the inner diameter of bushing 72 whereby the collar 74 is journalled within bushing 72 for longitudinal sliding movement therein. The collar 74 is provided with opposed longitudinally extending slots 78 which cooperate with a pin 80 that extends across bushing 72 through the opposed slots 78 to define and guide the sliding movement of collar 74 within bushing 72. A coil spring 82 is positioned around collar 74 and normally urges the collar inwardly to the position illustrated in FIG. 6. As shown most clearly in FIGS. 5 and 9, the ends of slots 78 are slightly restricted, as at 84, in order to act as a stop to prevent spring 82 from forcing collar 74 completely off pin 80. An annular recess 86 is provided at the inner edge of collar 74 for receiving the end 68 of tube 56. It will therefore be seen that when ever it is desired to mount a tube 56 in the oven 10, or, more specifically, in the housing 12, it is simply necessary to engage one end of the tube in the recess 86 and then press collar 74 against the action of spring 82 to provide sufficient clearance for the other end of the tube to be mounted in recess 66. The tube is then released, whereupon spring 82 will maintain the entrance end 60 of the tube resiliently urged into engagement with collar 62, as illustrated in FIG. 4. This resilient mounting not only enables the tubes 56 to be quickly mounted and attached whenever desired, but it also functions to prevent any leakage of air passing through the tube, which is important for reasons hereinafter to become apparent.

Referring now to FIGS. 3 and 4, there is shown means for regulating the velocity of air flow through the tube 56. More specifically, a stud 88 threaded as at 90 extends through wall 14 adjacent the entrance end of each tube. A regulating knob 92 is fixed to stud 88 for rotation therewith and is located adjacent the inner surface of wall 14. A bracket 94 is secured to the outer surface of wall 14 as by screws 96, said bracket being of substantially U-shape and having a wall 98 in spaced relation to wall 14. It will be seen that stud 88 extends through opening 100 in wall 14 and opening 102 in wall 98 and is maintained in assembled position by means of a nut 104 located on the outside of wall 98. As will be obvious, stud 88 is freely rotatable with respect to walls 14 and 98. A conical valve member 106 is provided with an integral upwardly extending portion 108 which has an opening 110 threadedly receiving stud 88. A second opening 112 is provided in portion 108, and an elongated guide pin 114 is pressed therein, whereby said pin and valve move as a unit. Aligned openings 116 in wall 14 and 118 in wall 98 freely receive the pin 114. It is important to note that conical valve 106 extends toward the open end of collar 62 and is centrally aligned with respect thereto. Thus it will be seen that when knob 92 is rotated, rotation will also be imparted to stud 88, which, due to its threaded interconnection with the upper portion 108 of valve 106, will cause said valve to move longitudinally with respect to tube 56. Guide pin 114 moves longitudinally with the valve and, due to the close clearance of said pin in openings 116 and 118, insures that the valve will always remain properly aligned with tube 56. A spring 120 is located around stud 88 between wall 14 and portion 108 and serves to impart a desired frictional drag on the rotary movement of stud 88 and knob 92, and at the same time, takes up any undesirable play that may exist between the threads 90 and the threaded hole 110. As will be quite obvious, the relative position of conical valve 106 with respect to the outer edge of collar 62, as determined by adjustment of knob 92, will determine the rate of flow of air through the tube 56.

It will be understood that other equivalent configurations could be used for valve 106 without departing from the scope of my invention. More specifically, valve 106 could be frusto-conical, semispherical, etc., and hence, when reference is herein made to a "conical" valve, this language shall be construed as being broad enough to cover other equivalent configurations.

Since each tube 56 has its own valve 106, it will be seen that different rates of flow can be simultaneously achieved throughout the various tubes, said rate of flow also being regulated, to a certain extent, by the adjustment of damper 38. Once the desired rate of flow has been set for each tube, and the test sample 54 positioned therein as illustrated in FIG. 1, it will be understood that the heated air will pass through said tubes and over the test samples. At the same time, heated air is circulating through the housing 12 between the tubes 56, and in order to enable this circulation to take place, bleeder holes 122 are provided in wall 14 intermediate the location of tube 56. Thus, after fresh, heated air has passed through the radiation fins 50, it is simultaneously circulated through tubes 56 at a rate of flow controlled by valves 106, as hereinbefore described, and through bleeder holes 122. Since the air passing over the test samples 54 in tube 56 becomes contaminated to the extent that certain plasticizers are absorbed by the air as it passes over the test samples, it is desirable, as has been hereinbefore explained, to exhaust this contaminated air from the oven without allowing it to mingle with any of the fresh air in the oven. This is accomplished by means of ducts 124 located and mounted on the outside surface of rear wall 16, said ducts functioning to carry off all air which is passed through the tubes 56 whereby same is exhausted from the oven as at 126. As will be seen most clearly in FIG. 2, the oven 10 and housing 12 are provided with four vertical rows of tubes 56, and there is one duct 124 provided for each vertical row. Expressed differently, the number of ducts required will always be the same as the number of vertical rows of the testing tubes that are present. It will be noted in FIG. 2 that the vertical rows are equally spaced from each other but that the horizontal rows are provided with greater spacing between the outermost rows and the two middle rows. The purpose of this is to provide space in housing 12 for manual manipulation of the tubes when it is desired to mount or remove same, etc. Thus, a greater spacing is provided between adjacent pairs of horizontal rows, as aforedescribed.

Since the fresh, heated air which has passed through bleeder holes 122 never comes in contact with the test samples, this air remains in the oven and is recirculated for further use. More specifically, bleeder holes 128 are provided in rear wall 16 for enabling this fresh, heated air to pass therethrough for recirculation. It is important to note that the bleeder holes are located between the ducts 124 since it is essential that this fresh air be completely segregated from the contaminated air which has passed over the test samples and into the ducts. It will be understood that as the contaminated air is exhausted from the oven as at 126, it will be replenished by fresh air that is being drawn in through the intake 36.

In situations where all of the testing tubes 56 are not being used, it is preferred to remove the empty tubes from the oven. In order to prevent, for reasons of economy, fresh circulating air from passing into the ducts 124 and then being exhausted from the oven, cover members 30 (FIGS. 7 and 8) are provided for insertion in rear wall 16 to cover the exit openings 70. More specifically, the cover members 130 are provided with a plurality of resilient spring fingers 132 which are adapted to resiliently grip the inner surface of bushing 72, as clearly illustrated in FIG. 8. It will be noted that when the cover members 130 are inserted in position, the collar 74 is urged to the position illustrated in FIG. 8 against the action of spring 82, it being understood that the resilient grip of cover 130 within bushing 72 is sufficiently strong to maintain spring 82 in the compressed position shown. With the covers 130 in place, it will be seen that air to be recirculated can only pass through bleeder holes 128, and hence, no fresh, uncontaminated air is wasted by having it pass into ducts 124. An alternative procedure that could be followed in connection with the tubes not being used would be to manipulate valve 106 so as to completely prevent any flow of air into the tubes not being used. It has been found, however, to be of greater convenience to remove entirely any tubes not being used and to use the covers 130, as aforedescribed.

Auxiliary to the structure hereinbefore described is the apparatus used in presetting the specific rate of flow within the tubes. This consists of a tube (not shown) of dimensions equal to the specimen tubes. For practical purposes, this testing tube is made of metal, and it is provided with a slot to permit insertion of the probe of a velometer. With this special tube inserted in place of one of the specimen tubes 56, and with the oven at the desired test temperature, and the damper 38 preset, the valves 106 are adjusted until the probe of the velometer which has been inserted in the tube opening gives the desired reading. This procedure is continued with each tube, although it will be understood that the damper 38 is not varied.

If, for any reason, such as for cleaning purposes or the like, it is desired to disassemble collar 74 from bushing 72, it is simply necessary to slightly spread apart the ends of slots 78 whereupon pin 80 is free to pass between projections 84. It is also pointed out that the projections 84 may be formed in any desirable manner, one suggested procedure being to punch the collar 74 adjacent the ends of slots 78, as at 134, whereupon the metal is sufficiently upset to provide the projections 84.

Although the materials of which the various parts of the instant oven are constructed are not actually critical, it will be understood that materials possessing suitable strength and corrosion resistance should be selected. For example, the oven itself may be constructed primarily of aluminum, while the tube mounting structure and valve 106 are preferably of stainless steel. The specimen tubes are preferably of glass whereupon the samples being tested can be visually inspected when the door to the oven is open.

An important advantage of the foregoing invention is the fact that it is easily adaptable to the conventional oven now being used for testing elastomers. More specifically, existing ovens can be easily modified by the addition of my novel tube mounting means wherein the tube may be easily mounted and detached, but at the same time is substantially air tight when attached. It is also a simple matter to provide the ducts 124 for exhausting contaminated air. Lastly, substitution of my novel valve means can also be easily accomplished, it once again being emphasized that my particular conical valve, as aforedescribed, results in a lessening in turbulence and hence a more uniform flow of air through the specimen tubes. More specifically, in tubular ovens now in use it has been necessary to place the specimens a certain distance from the entrance end of the tube to allow the turbulence of the incoming air to diminish before contacting the speciments. This obviously reduced the testing capacity of the tube space. By means of my improved valve, as aforedescribed, it is now possible to use a longer portion of the tube for testing purposes, thus increasing the overall testing capacity of the oven.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. Apparatus for performing accelerated aging tests on elastomers, comprising an oven, an elongated tube having entrance and exit ends mounted in said oven, means circulating fresh, heated air through said oven to the entrance end of said tube, means regulating the flow of fresh, heated air through said tube, and means segregating and exhausting from the oven all air which emanates from the exit end of said tube, said regulating means comprising a conical valve extending into the entrance end of said tube, and means mounting said valve for axial movement with respect to said tube, whereby the position of said valve with respect to said tube determines the rate of flow of air through said tube.

2. Apparatus for performing accelerated aging tests on elastomers, comprising an oven, a housing within said oven having side walls and a front, rear, top and bottom wall, said housing being spaced from the walls of the oven whereby air is free to circulate around said housing, a plurality of tubes extending from said housing front to rear wall, entrance and exit openings in said front and rear walls, respectively, in alignment with said tubes, additional openings in said front and rear walls intermediate said aforementioned entrance and exit openings, means connected to each of said entrance openings for regulating the flow of air through each tube, and means connected to each of said exit openings for exhausting all air which has passed through the tubes from the oven without permitting mingling of said air with the other air in the oven.

3. The apparatus of claim 2 further characterized in that said tubes are detachably mounted between said front and rear walls.

4. The apparatus of claim 2 further characterized in that said entrance and exit openings are provided with mounting collars for receiving the ends of said tubes in substantially air-tight relation, at least one of said collars associated with each tube being spring loaded to facilitate mounting and detachment of the tube.

5. The apparatus of claim 2 further characterized in that said exhausting means comprise ducts adjacent said rear wall.

6. The apparatus of claim 2 further comprising means for replenishing the oven with fresh air in place of air that is exhausted.

7. The apparatus of claim 2 further characterized in that said regulating means comprises a conical valve extending into each of said entrance openings, and means mounting said valve for axial movement with respect to its associated tube, whereby the position of said valve with respect to said tube determines the rate of flow of air through said tube.

References Cited in the file of this patent
UNITED STATES PATENTS

| | | |
|---|---|---|
| 1,721,774 | Denison | July 23, 1929 |
| 1,911,533 | Sachs et al. | May 30, 1933 |
| 2,170,500 | Knowlton et al. | Aug. 22, 1939 |
| 2,288,297 | Naiman | June 30, 1942 |
| 2,640,354 | Bernegger | June 2, 1953 |

OTHER REFERENCES

Publication: "Aging and Weathering of Rubber," book by Buist, Institute of the Rubber Industry, Cambridge (1956), pages 71–80.

ASTM Standards on Rubber Products, Committee D 11, 19th ed., March 1960 (Philadelphia), pages 920–922.